United States Patent [19]

Chao

[11] Patent Number: 4,727,209
[45] Date of Patent: Feb. 23, 1988

[54] HYDROCARBON ALKYLATION PROCESSES EMPLOYING A PHOSPHORUS-MODIFIED ALUMINA COMPOSITE

[75] Inventor: Tai-Hsiang Chao, Mount Prospect, Ill.

[73] Assignee: UOP Inc., Des Plaines, Ill.

[21] Appl. No.: 941,239

[22] Filed: Dec. 12, 1986

Related U.S. Application Data

[63] Continuation-in-part of Ser. No. 743,349, Jun. 11, 1985, Pat. No. 4,629,717.

[51] Int. Cl.$^4$ .............................. C07C 2/54; C07C 2/66
[52] U.S. Cl. ...................................... 585/466; 585/467; 585/468; 208/134; 208/135
[58] Field of Search ............... 208/108, 112, 138, 135; 502/208, 355; 585/463, 466, 468, 446, 709, 708, 467

[56] References Cited

U.S. PATENT DOCUMENTS

| 2,349,827 | 5/1944 | Mattox | 196/50 |
|---|---|---|---|
| 2,441,297 | 5/1943 | Stirton | 260/668 |
| 3,342,760 | 9/1967 | Kearby | 252/437 |
| 3,607,959 | 9/1971 | Estes et al. | 585/463 |
| 3,879,310 | 4/1975 | Rigge et al. | 252/435 |
| 3,928,179 | 12/1975 | Gatsis | 208/213 |
| 3,969,273 | 7/1976 | Brown et al. | 252/435 |
| 4,048,247 | 9/1977 | Ryu | 585/463 |
| 4,080,311 | 3/1978 | Kehl | 252/437 |
| 4,202,798 | 5/1980 | Johnson et al. | 252/437 |
| 4,210,560 | 7/1980 | Kehl | 252/437 |
| 4,319,983 | 3/1982 | Yoo | 208/108 |
| 4,379,761 | 4/1983 | Olson et al. | 585/466 |
| 4,423,266 | 12/1983 | Young | 585/466 |
| 4,433,187 | 2/1984 | Young | 585/467 |
| 4,463,207 | 7/1984 | Johnson | 585/463 |
| 4,483,767 | 11/1984 | Antos et al. | 208/138 |
| 4,504,690 | 3/1985 | Forbus et al. | 585/466 |
| 4,624,938 | 11/1986 | Kemp | 208/216 R |
| 4,629,716 | 12/1986 | Kemp | 502/208 |
| 4,629,717 | 12/1986 | Chao | 502/208 |
| 4,668,837 | 5/1987 | Dianis | 585/466 |

FOREIGN PATENT DOCUMENTS 950439  7/1974  Canada ............................ 252/41

OTHER PUBLICATIONS

Technology Newsletter, Chemical Week, Sep. 22, 1982, p. 46.
Chemistry of the Colloidal State, Ware, J. C., Gels, Chapter XII, p. 240.

*Primary Examiner*—Helen M. S. Sneed
*Assistant Examiner*—Anthony McFarlane
*Attorney, Agent, or Firm*—Thomas K. McBride; John F. Spears, Jr.

[57] ABSTRACT

Hydrocarbon conversion processes including hydrocracking and hydrotreating are performed utilizing a novel phosphorus-modified alumina composite comprising a hydrogel having a molar ratio on an elemental basis of phosphorus to aluminum of from 1:1 to 1:100 together with a surface area of about 140 to 450 m$^2$/gm. The composite is prepared by admixing an alumina hydrosol with a phosphorus-containing compound to form a phosphorus-modified sol and gelling said admixture.

11 Claims, 6 Drawing Figures

IR Spectra Of Oil Drop Aluminum Phosphate Spheres
(20.5 Wt. % Al, 24.7 Wt. % P)

HYDROCARBON ALKYLATION PROCESSES EMPLOYING A PHOSPHORUS-MODIFIED ALUMINA COMPOSITE

This is a continuation-in-part of my prior copending application Ser. No. 743,349 filed 11 June, 1985, now U.S. Pat. No. 4,629,717.

BACKGROUND OF THE INVENTION

The present invention relates to a novel phosphorus-modified alumina hydrogel composite and its method of manufacture. The invention also relates to the use of the composite, e.g., as a catalyst, or catalyst carrier in a hydrocarbon conversion process.

Alumina spheres useful as a carrier for a catalyst composition can be manufactured by the oil-drop method. An oil-drop process for manufacturing spherical alumina is taught in U.S. Pat. No. 2,620,314, the teachings of which are incorporated herein by reference. Spherical alumina is manufactured by the steps of commingling alumina hydrosol with a gelling agent which is hydrolyzable at an elevated temperature, dispersing the resulting mixture as droplets in a suspending medium thereby forming hydrogel particles, aging the hydrogel particles, washing with water, drying and calcining.

Phosphorus may be incorporated into catalyst carriers in various manners. Canadian Pat. No. 950,439 teaches the addition of a solution of phosphate ions to an alumina-containing hydrogel. In the specification, patentee defines the term "hydrogel" as an undried gel, precipitated hydrous oxide, or combinations thereof which are washed free of salts resulting from the gelation or precipitation reactions. Hydrogels are distinguished from sols in that the term "sol" refers to colloidal dispersion of polymeric aluminum hydroxide salts which behave as true liquids.

U.S. Pat. No. 4,066,572 issued to M. E. Choca is pertinent for its teaching in regard to phospha-alumina gels but relates only to precipitated gels and not true homogeneous hydrogels. Precipitated gels have been recognized as not being homogeneous.

U.S. Pat. No. 4,444,962 issued to M. P. McDaniel et al. is also pertinent for its teaching of a catalyst support formed of aluminum orthophosphate but does not suggest utilization of materials of the aluminum to chloride ratio described herein.

U.S. Pat. No. 4,310,440 issued to S. T. Wilson et al. is pertinent as it relates to aluminophosphate compositions. The reference, however, describes crystalline materials while the subject invention relates to amorphous materials.

U.S. Pat. No. 2,938,874 issued to E. J. Rosinski describes phosphate-containing alumina gels, but does not suggest utilization of the aluminum to chloride ratios disclosed herein and yields a product of significantly different physical characteristics as measured by surface area, density and NMR spectra.

Similar to Canadian Pat. No. 950,439, U.S. Pat. No. 4,202,798 discloses a composite formed by a method which comprises adding phosphorus-containing compounds to an aqueous mixture of hydrous alumina. Hydrous alumina such as gibbsite, bayerite, randomite, etc., may be prepared by precipitation from an aqueous solution of a soluble aluminum salt such as aluminum chloride. The hydrous alumina is different from a sol in that the former is not a liquid colloidal suspension of aluminum hydroxyl chloride polymer and does not have true liquid properties.

Another method of utilizing phosphorus in the production of alumina supports is disclosed in U.S. Pat. No. 3,969,273. In particular, the patentee adds phosphate ions to a dried alumina gel. No significant change of nitrogen pore volume was observed.

U.S. Pat. No. 3,879,310 teaches the use of phosphate ions to stabilize pseudo-boehmitic alumina by incorporating the phosphate ion either during the precipitation of the pseudo-boehmitic alumina or by adding the phosphate ion to freshly precipitated pseudo-boehmitic alumina. The precipitation of the pseudo-boehmitic alumina is carried out by interacting a sodium aluminate solution with aqueous nitric acid. Phosphate ion is added to either of the reactants or simultaneously during the admixture of the sodium aluminate with the nitric acid. This phosphate stabilized pseudo-boehmitic alumina has X-ray diffraction peak intensity ($I/I_o$) in the range of 6.5-6.8 Angstroms and contains a pseudo-boehmite content of at least 30% by weight.

U.S. Pat. No. 2,890,167 utilizes phosphorus in a reforming catalyst comprising a refractory oxide, halogen and a platinum group metal. Impregnation of the inorganic oxide with a solution of phosphoric acid is suggested as a convenient method of incorporating the phosphorus.

Aluminum phosphate is precipitated onto an alumina gel in U.S. Pat. No. 2,441,297 so as to improve the heat stability and mechanical strength of the catalyst base prepared in such a manner. Similarly, U.S. Pat. No. 2,349,827 teaches the addition of powdered aluminum phosphate to a washed hydrogel. In both cases, the resultant composition contains a physical mixture of alumina and aluminum phosphate.

U.S. Pat. No. 3,342,750 teaches several methods of producing aluminum phosphate gels. One method involves reacting an aqueous solution of aluminum chloride and phosphoric acid with ethylene oxide, the amount of ethylene oxide being sufficient to produce gelling to a hydrogel. This method, however, requires the extraction of the hydrogel with an organic water-soluble extracting agent. The extraction step is necessary to remove carbonaceous material from the hydrogel and increase the surface area of the dried and calcined gel.

In another method disclosed in the last-mentioned patent, dilute ammonium hydroxide must be slowly added to an aluminum chloride-phosphoric acid solution until the pH of the solution reaches about 1.0. A hydrogel is then formed by adjusting the pH of the solution to between 5 and 9 by adding a compound such as ammonium acetate or hexamethylenetetramine. Patentee's hydrogel must then be extracted with an organic water soluble extracting agent to prevent the formation of the carbonaceous materials. Patentee points out that it is essential that three preparation variables be observed to obtain high surface area aluminum phosphate gels, namely, (1) very slow addition of $NH_4OH$; (2) a final pH of 5-6; and (3) removal of water by extraction before drying.

The composite of U.S. Pat. No. 3,342,750, though exhibiting high surface area at the outset, is hydrothermally unstable (see column 12, lines 4-13). Furthermore, the $AlPO_4$ gel prepared in accordance with the methods disclosed in U.S. Pat. No. 3,342,750 possesses significant catalytic cracking activity (See Example 10) coupled with a relatively small pore diameter.

U.S. Pat. No. 4,210,560 discloses a catalyst support comprising magnesia-alumina-aluminum phosphate matrix. In contrast to an "oil drop" gelation procedure, the patentee employs a precipitation procedure wherein aluminum salts, magnesium salts, and phosphoric acid are precipitated with ammonium hydroxide. Due to the specific method of precipitation, the matrix possesses an amorphous morphology.

Finally, U.S. Pat. No. 4,080,311 teaches a thermally stable composite precipitate containing aluminum phosphate and alumina having a surface area of from about 100 to 200 m$^2$/g. The composite disclosed, however, is an alumina-aluminum phosphate composite precipitate and not a gel. The art has recognized that gels are distinct from precipitates. (See Ware, J. C., *Chemistry of the Colloidal State*, Gels, Chapter XII, the teachings of which are incorporated herein).

There have been various attempts to account for and reconcile the differences between gels and precipitates. In general, however, a gel is considered to be a solidified sol with a high degree of reversibility between the two states. The gel structure is believed to be a capillary arrangement of fibrils or a "brush heap" which develops from a dispersed phase. The substance, or "fibers", constituting the dispersed phase by way of capillary attraction or adhesion, encloses the liquid phase forming the gel. The orientation-coalescence formation of a gel is an essential distinction between precipitation and gelation. In precipitation, the holding power between the suspension and water is decreased or destroyed, while in a gel this adhesion remains unimpaired. In any event, the various theories evince basic characteristic differences between gels and precipitates.

Kehl, in U.S. Pat. No. 4,080,311, employs an aluminum salt as alumina starting material and not a colloidal polymeric aluminum sol. This difference in starting material results in the formation of an alumina-aluminum phosphate composite precipitate. See column 3, lines 14-15. Kehl asserts that the precipitate is a new composition of matter possessing excellent thermal stability together with relatively high average pore radii.

SUMMARY OF THE INVENTION

It has now been discovered that a phosphorus-modified alumina hydrogel composite exhibits increased surface area and micropore volume while maintaining average pore diameter and decreasing alumina crystallite size and average bulk density. This novel composite is particularly suited for use as a catalyst support in hydrocarbon conversion catalytic processes offering higher catalyst activity and stability.

The present invention provides hydrocarbon conversion processes which comprise contacting a hydrocarbon feedstock at hydrocarbon conversion conditions with a catalyst comprising an amorphous phosphorus-modified alumina hydrogel composite having a molar ratio on an elemental basis of phosphorus to aluminum of from about 1:1 to 1:100 and having a surface area of from about 140 to 450 m$^2$/g.

DETAILED DESCRIPTION OF THE INVENTION

Figure 1:
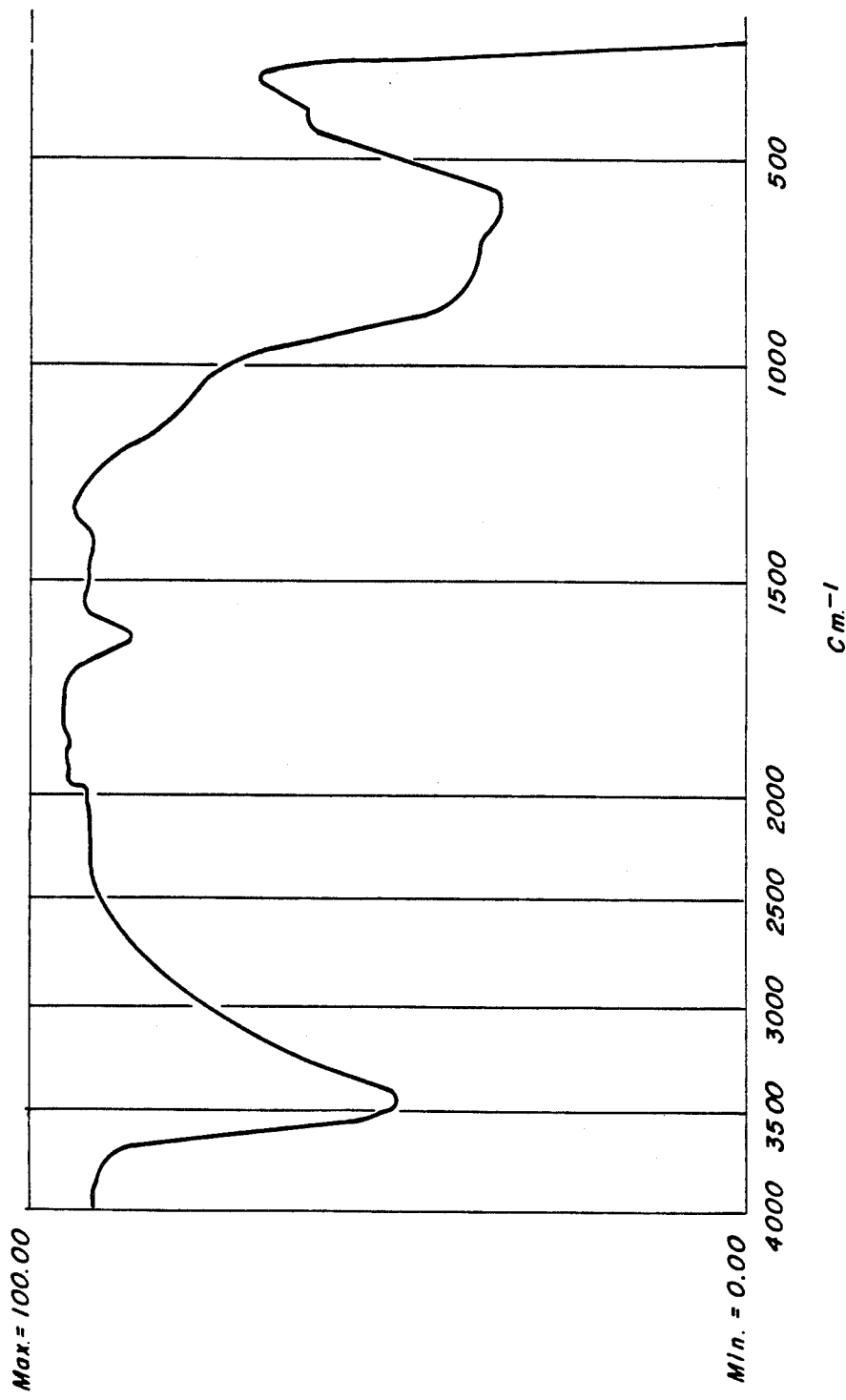
FIGS. 1-6 constitute infrared spectra for various alumina compositions.

Refractory inorganic oxide particles of spherical shape offer numerous advantages when employed as a support or carrier material for catalytically active metallic components. When disposed in a fixed bed in a reaction or contact zone, the spherical particles permit more uniform packing and reduce the tendency of the reactant stream to channel through the catalyst bed. When employed in a moving bed type of operation, that is, where the particles are transported from one zone to another by the reactants or an extraneous carrying medium, the spheroidal particles have a further advantage in that there are no sharp edges to break or wear off during processing, thus creating a tendency to restrict the flow through process equipment.

One preferred method of preparing the refractory inorganic oxide as spheroidal particles is in the gelation of a hydrosol precursor of the refractory inorganic oxide in accordance with the oil-drop method. Said hydrosols are such as are prepared by the general method whereby an acid salt of an appropriate metal is hydrolyzed in aqueous solution and the solution treated at conditions to reduce the acid compound concentration thereof, as by neutralization. The resulting olation reaction yields inorganic polymers of colloidal dimension dispersed and suspended in the remaining liquid. For example, an amorphous alumina hydrosol can be prepared by the hydrolysis of an acid salt of aluminum, such as aluminum chloride, in aqueous solution, and treating said solution at conditions to reduce the resulting chloride compound concentration thereof, as by neutralization, to achieve an aluminum/chloride compound weight ratio from about 0.70:1 to about 1.5:1.

In accordance with the method of the present invention, a phosphorus-containing compound is added to the above-described hydrosol to form a phosphorus-modified hydrosol. Representative phosphorus-containing compounds which may be utilized in the present invention include $H_3PO_4$, $H_3PO_2$, $H_3PO_3$, $(NH_4)H_2PO_4$, $(NH_4)_2HPO_4$, $K_3PO_4$, $K_2HPO_4$, $KH_2PO_4$, $Na_3PO_4$, $Na_2HPO_4$, $NaH_2PO_4$, $PX_3$, $RPX_2$, $R_2PX$, $R_3P$, $X_3PO$, $(XO)_3PO$, $(XO)_3P$, $R_3PO$, $R_3PS$, $RPO_2$, $RPS_2$, $RP(O)(OX)_2$, $RP(S)(SX)_2$, $R_2P(O)OX$, $R_2P(S)SX$, $RP(OX)_2$, $RP(SX)_2$, $ROP(OX)_2$, $RSP(SX)_2$, $(RS)_2PSP(SR)_2$, and $(RO)_2POP(OR)_2$, where R is an alkyl or aryl, such as a phenyl radical, and X is hydrogen, R, or halide. These compounds include primary, $RPH_2$, secondary, $R_2PH$ and tertiary, $R_3P$ phosphines such as butyl phosphine, the tertiary phosphine oxides $R_3PO$, such as tributylphosphine oxide, the tertiary phosphine sulfides, $R_3PS$, the primary, $RP(O)(OX)_2$, and secondary, $R_2P(O)OX$, phosphonic acids such as benzene phosphonic acid, the corresponding sulfur derivatives such as $RP(S)(SX)_2$ and $R_2P(S)SX$, the esters of the phosphonic acids such as dialkyl phosphonate, $(RO)_2P(O)H$, dialkyl alkyl phosphonates, $(RO)_2P(O)R$, and alkyl dialkyl-phosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites, and esters thereof, such as the monopropyl ester, alkyl dialkylphosphinites, $(RO)PR_2$ and dialkyl alkylphosphinite, $(RO)_2PR$, esters. Corresponding sulfur derivates may also be employed including $(RS)_2P(S)H$, $(RS)_2P(S)R$, $(RS)P(S)R_2$, $R_2PSX$, $(RS)P(SX)_2$, $(RS)_2PSX$, $(RS)_3P$, $(RS)PR_2$ and $(RS)_2PR$. Examples of phosphite esters include trimethylphosphite, triethylphosphite, diisopropylphosphite, butylphosphite, and pyrophosphites such as tetraethylpyrophosphite. The alkyl groups in the mentioned compounds preferably contain one to four carbon atoms.

Other suitable phosphorus-containing compounds include ammonium hydrogen phosphate, the phosphorus halides such as phosphorus trichloride, bromide, and iodide, alkyl phosphorodichloridites, $(RO)PCl_2$, dialkylphosphosphorochloridites, $(RO)_2PCl$, dialkylphosphinochloridites, $R_2PCl$, alkyl alkylphosphonochloridates, $(RO)(R)P(O)Cl$, dialkylphosphinochloridates, $R_2P(O)Cl$ and $RP(O)Cl_2$. Applicable corresponding sulfur derivatives include $(RS)PCl_2$, $(RS)_2PCl$, $(RS)(R)P(S)Cl$ and $R_2P(S)Cl$.

A 1:1 molar ratio of aluminum to phosphorus in the phosphorus-modified sol corresponds to a final calcined spheroidal particle composition containing 24.74 wt. % phosphorus and 20.5 wt. % aluminum, while a 1:100 molar ratio corresponds to a final composition of 0.6 wt. % phosphorus and 52.0 wt. % aluminum.

The aluminum chloride hydrosol is typically prepared by digesting aluminum in aqueous hydrochloric acid and/or aluminum chloride solution at about reflux temperature, usually from about 80° to about 105° C., and reducing the chloride compound concentration of the resulting aluminum chloride solution by the device of maintaining an excess of the aluminum reactant in the reaction mixture as a neutralizing agent. The alumina hydrosol is an aluminum chloride hydrosol variously referred to as an aluminum oxychloride hydrosol, aluminum hydroxychloride hydrosol, and the like, such as is formed when utilizing aluminum metal as a neutralizing agent in conjunction with an aqueous aluminum chloride solution. In any case, the aluminum chloride hydrosol is prepared to contain aluminum in from about a 0.70:1 to about 1.5:1 weight ratio with the chloride compound content thereof.

In accordance with the method of invention, phosphorus-modified alumina particles are prepared by a method which comprises admixing the alumina hydrosol with a phosphorus-containing compound, the phosphorus to aluminum molar ratio in the resulting phosphorus-modified admixture being from 1:1 to 1:100 on an elemental basis and subsequently gelling said admixture to obtain said particles.

In one embodiment, gelation is effected by commingling the phosphorus-modified admixture with a gelling agent which is hydrolyzable at an elevated temperature, dispersing said commingled admixture as droplets in a suspending medium under conditions effective to transform said droplets in a suspending medium into hydrogel particles, aging said hydrogel particles in a suspending medium, washing said hydrogel particles with water, drying, and calcining said hydrogel particles to obtain phosphorus-modified alumina spheroidal particles.

In another embodiment gelation may be carried out by spray drying the above-described phosphorus-modified alumina hydrosol or commingling the subject hydrosol with a gelling agent and then spray drying. Spray drying may typically be carried out at a temperature of 800° F. (425° C.) to 1400° F. (760° C.) at about atmospheric pressure.

The gelling agent is typically a weak base which, when mixed with the hydrosol, will cause the mixture to set to a gel within a reasonable time. In this type of operation, the hydrosol is typically set by utilizing ammonia as a neutralizing or setting agent. Usually, the ammonia is furnished by an ammonia precursor which is added to the hydrosol. The precursor is suitably hexamethylenetetramine, or urea, or mixtures thereof, although other weakly basic materials which are substantially stable at normal temperatures, but decompose to form ammonia with increasing temperature, may be suitably employed. It has been found that equal volumes of the hydrosol and of the hexamethylenetetramine solution to alumina sol solution are satisfactory, but it is understood that this may vary somewhat. The use of a smaller amount of hexamethylenetetramine solution tends to result in soft spheres while, on the other hand, the use of larger volumes of base solution results in spheres which tend to crack easily. Only a fraction of the ammonia precursor is hydrolyzed or decomposed in the relatively short period during which initial gelation occurs.

An aging process is preferably subsequently employed. During the aging process, the residual ammonia precursor retained in the spheroidal particles continues to hydrolyze and effect further polymerization of the hydrogel whereby desirable pore characteristics are established. Aging of the hydrogel is suitably accomplished over a period of from about 1 to about 24 hours, preferably in the oil suspending medium, at a temperature of from about 60° to about 150° C. or more, and at a pressure to maintain the water content of the hydrogel spheres in a substantially liquid phase. The aging of the hydrogel can also be carried out in aqueous $NH_3$ solution at about 95° C. for a period up to about 6 hours. Following the aging step, the hydrogel spheres may be washed with water containing ammonia.

After the hydrogel particles are aged, a drying step is effected. Drying of the particles is suitably effected at a temperature of from 38° to about 205° C. Subsequent to the drying step, a calcination step is effected at a temperature of from about 425° to about 760° C. for 2 to 12 hours or more which may be carried out in the presence of steam. The calcined particles are useful as is or impregnated with other catalytic components.

The novel phosphorus-modified alumina composite of the present invention possesses a high surface area, and a high micropore volume. The novel composite is useful as a catalyst support when manufactured in accordance with the above.

The total pore volume of porous refractory inorganic oxide particle utilized as a catalyst support or carrier material is typically expressed in terms of pore size distribution, that is, in terms of the pore volume attributable to macropores and pore volume attributable to micropores. As herein contemplated, micropores are those pores having an average diameter of less than about 600 Angstroms as determined from the adsorption isotherm for nitrogen at liquid nitrogen temperatures and at a relative pressure $(P/P_o)$ of 0.97. The micropore volume will then consist of that portion of the total pore volume attributable to pores less than about 600 Angstroms in diameter, and the macropore volume will be the difference between the total pore volume and the micropore volume. The total pore volume is determined by the mercury intrusion method. The total surface area of the refractory inorganic oxide particles is a function of the micropore volume, substantially all of the surface area being associated with pores of less than about 600 Angstroms in diameter.

As already mentioned above, according to the present invention it is possible to manufacture high surface area phosphorus-modified alumina via the oil-drop method. The surface areas achieved by practice of the present invention are substantially greater than the surface area of conventional gamma-alumina manufactured by the oil-drop method and alumina-aluminum phosphates by precipitation methods. The conventional oil-dropped alumina possesses a surface area of up to about 250 m²/g. Spheroidal alumina particles manufactured in accordance with the present invention possess a surface area of up to about 450 m²/g.

The present invention also provides for a method of controlling the surface area of the phosphorus-modified composite by varying the amount of phosphorus-containing compounds added to the sol. Further, the degree of crystallinity of the phosphorus-modified particles can be controlled by varying the amount of phosphorus-containing compound added to the alumina hydrosol which varies the wt. % gamma-alumina in the calcined particles as well as the crystallite size. Eventually, as the amount of phosphorus-containing compound added to the hydrosol is increased and reaches a certain value, the calcined spheres become entirely amorphous, as determined by X-ray diffraction analysis. The material that is contained in the particles of the present invention that is not in an amorphous phase is present as a crystalline gamma-alumina phase, thus, by controlling the wt. % gamma-alumina present in the particle, the degree of crystallinity of the particle is, in effect, controlled. As the phosphorus content is decreased, the degree of crystallinity is increased, as measured by the wt. % gamma-alumina via X-ray diffraction analysis. This is in contrast to the magnesia-alumina-aluminum phosphate matrix disclosed in U.S. Pat. No. 4,210,560 and the alumina-aluminum phosphate matrix disclosed in U.S. Pat. No. 4,080,311 wherein the respective matrices are characterized as amorphous. The presence of a well-controlled amount of gamma-alumina in the composition of the present invention is also in contrast to the composition disclosed in U.S. Pat. No. 3,879,310 which contains pseudo-boehmitic alumina.

The present invention also provides for a method of controlling the average bulk density of the phosphorus-modified composite by varying the amount of phosphorus-containing compounds added to the hydrosol such that, as the quantity of phosphorus increases, the relative average bulk density decreases.

The catalytic composite employed in the subject invention may accordingly be characterized as a catalytic composite having low cracking activity and comprising an amorphous phosphorus-modified alumina hydrogel having a molar ratio on an elemental basis of phosphorus to aluminum of from about 1:1 to 1:100 and having a surface area of from about 140 to 450 m²/g said hydrogel being formed by the gelation of a homogeneous hydrosol having an aluminum to chloride compound weight ratio of from about 0.70:1 to 1.5:1. The hydrogel preferably has a surface area of from about 225 to 450 m²/g and a molar ratio of phosphorus to aluminum on an elemental basis of about 1:1.6 to 1:100.

The phosphorus-modified alumina particles of the present invention may contain minor proportions of other well-known refractory inorganic oxides such as silica, titanium dioxide, zirconium dioxide, tin oxide, germanium oxide, chromium oxide, beryllium oxide, vanadium oxide, cesium oxide, hafnium oxide, zinc oxide, iron oxide, cobalt oxide, magnesia, boria, thoria, and the like materials which can be added to the hydrosol prior to dropping. The finished phosphorus-modified material, which may have been dried and/or calcined, can be crushed to a powder and blended with the just listed materials and then formed as by extrusion. For instance, oil dropped phosphorus-modified alumina containing a Y zeolite, added to the hydrosol, may be produced as a powder and blended with alumina and/or silica alumina to produce a hydrocracking catalyst base to which hydrogenation components are added. The admixture of the phosphorus-modified alumina with a second oxide may therefore result in a total amorphous composite, one having localized regions of crystallinity or one having either an amorphous or crystalline matrix surrounding a dispersion of contrasting material.

In the same manner, crystalline zeolite aluminosilicates can be incorporated into the hydrosol prior to dropping. Typical zeolites having cracking activity which can be suitably dispersed in the phosphorus-modified alumina for use as a catalytic cracking catalyst are well known in the art. Suitable zeolites are described, for example, in U.S. Pat. No. 3,660,274, incorporated herein by reference. Synthetically prepared zeolites are initially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between 6 Angstroms and 15 Angstroms in diameter. The overall formula for the zeolites can be represented as follows:

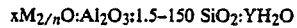

$$xM_{2/n}O:Al_2O_3:1.5-150\ SiO_2:YH_2O$$

where M is a metal cation and n is its valence and x varies from 0 to 1 and y is a function of the degree of dehydration and varies from 0 to 9, M is preferably a rare earth metal cation such as lanthanum, cerium, praseodymium, neodymium, etc., or mixtures of these.

Zeolites which can be employed in combination with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurrite, scolecite, natrolite, offretite, mesolite, mordenite, brewsterite, ferrierite, and the like. Suitable synthetic zeolites which can be treated in accordance with this invention include zeolites X, Y, A, L, ZK-4, B, E, F, HJ, M, Q, T, W, Z, alpha, beta, ZSM-types including ZSM-5 and omega zeolites. The term "zeolites" as used herein contemplates not only aluminosilicates, but substances in which the aluminum is replaced by gallium and substances in which the silicon is replaced by germanium.

The phosphorus-modified alumina particles of the present invention may also be used as a support or carrier for catalytic material. In general, these materials will comprise metals or compounds of such metals which include Groups IB, IIA, IIB, IIIB, IVA, IVB, VB, VIB, VIIB and VIII and rare earth Lanthanide series. These metals may be composited either prior to, during or after formation of the hydrogel of the present invention. Thus, these metals may be added to the hydrosol prior to formation of the hydrogel or impregnated in any suitable manner known in the art subsequent to the formation of the hydrogel. Such impregnation techniques would include dip, evaporative and vacuum impregnation.

The metal may be present in the elemental state or any other compound form such as an oxide or sulfide. Different combinations of the above metals may be employed and they may be present alone or in combination of elemental and/or metal compounds. Preferred metal components and/or compounds, especially in a hydrotreating catalyst, will comprise metals from Group VIB and Group VIII, the preferred Group VIB metal usually being molybdenum or tungsten and the preferred Group VIII metal usually being nickel or cobalt.

According to one embodiment of the present invention, a hydrocarbon charge stock and hydrogen are contacted with a catalyst composite of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst with best results obtained in the vapor phase.

Customary separation procedures may be employed to recover the reaction products. For instance, the effluent of a vapor-phase reaction zone may be subjected to cooling to cause at least partial condensation followed by vapor-liquid separation. A hydrogen-rich vapor produced in this manner is preferably recycled to the reaction zone while the liquid phase is passed into recovery facilities. Normally the liquid is first passed into a stripping column to remove hydrogen and light by-products during a petrochemical type process such as alkylation. The bottoms liquid is then fractionated into one or more recycle streams and a heavier (less volatile) product stream. In the case of isomerization, adsorptive-type separation may be employed. In a hydrocracking or hydrotreating embodiment, the liquid from the vapor-liquid separation zone may be passed directly into a primary fractionation column which produces the product, light ends and any recycle streams.

The conditions utilized in the numerous hydrocarbon conversion embodiments of the present invention are those customarily used in the art for the particular reaction, or combination of reactions, that is to be effected. These conditions include a temperature of about 100° F. (38° C.) to 1500° F. (815° C.), a pressure of from atmospheric (101.3 kPa) to about 3,000 psig (20,685 kPa gauge), a LHSV (calculated on the basis of equivalent liquid volume of the charge stock contacted with the catalyst per hour divided by the volume of conversion zone containing catalyst) of about 0.1 hr$^{-1}$ to about 20 hr$^{-1}$, and hydrogen circulation rates of 1,000 to 50,000 standard cubic feet per barrel of charge (1700 to 88,900 std m$^3$/m$^3$).

In the case of hydrogenation which includes desulfurization and denitrification, reaction conditions include: a temperature of about 200° F. (93° C.)–1000° F. (538° C.), a pressure of atmospheric (101.3 kPa) to 3,000 psig (20,685 kPa gauge), a LHSV of about 0.5 hr$^{-1}$ to 20 hr$^{-1}$, and hydrogen circulation rates of 1,000 to 50,000 s.c.f. per barrel of charge (1700 to 88,900 std m$^3$/m$^3$). Likewise, typical hydrocracking conditions include: a temperature of about 400° F. (205° C.)–1500° F. (815° C.), a pressure of atmospheric (101.3 kPa) to about 3,000 psig (20,685 kPa gauge), a LHSV of about 0.1 hr$^{-1}$ to 15 hr$^{-1}$, and hydrogen circulation rates of 1,000 to 30,000 s.c.f. per barrel of charge (1700 to 53,300 std m$^3$/m$^3$).

The hydrocarbon charge stock subject to hydroconversion in accordance with the process embodiment of this invention is suitably a petroleum hydrocarbon fraction boiling in the range of from about 400° F. (205° C.) to about 1200° F. (650° C.). The hydrocarbon charge stock is reacted with an external source of hydrogen at hydroconversion conditions.

Petroleum hydrocarbon fractions which can be utilized as charge stock thus include the gas oils, fuel oils, kerosene, etc., recovered as distillate in the atmospheric distillation of crude oils, also the light and heavy vacuum gas oils resulting from the vacuum distillation of the reduced crude, the light and heavy cycle oils recovered from the catalytic cracking process, light and heavy coker gas oils resulting from low pressure coking, coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in this process although it may be desirable to blend such oils with lower boiling petroleum hydrocarbon fractions for economical operation. The petroleum hydrocarbon charge stock may boil substantially continuously between about 400° F. to about 1200° F. (205°–650° C.) or it may consist of any one, or a number of petroleum hydrocarbon fractions, such as are set out above, which distill over within the 400°–1200° F. range. Suitable hydrocarbon feedstocks also include hydrocarbons derived from tar sand and oil shale.

As is evident from the above discussion, the present invention employs for a novel phosphorus-modified alumina composite possessing a high surface area, a low degree of crystallinity character and high micropore volume. Furthermore, the present invention provides for a method of controlling the surface area, ABD, degree of crystallinity and crystallite size of the particle. The phosphorus-modified alumina composite of the present invention, as mentioned above, may be used either alone or in combination with refractory oxides and zeolites, as a support or carrier for catalytic materials. These composites are useful as hydrocarbon conversion catalysts in hydrocarbon conversion processes. In general, the catalytic materials comprise metals or compounds of such metals which include Groups IB, IIA, IIB, IIIB, IVA, IVB, VB, VIB, VIIB, and VIII and rare earth Lanthanide series.

The following examples are presented in illustration of this invention and are not intended as an undue limitation on the generally broad scope of the invention as set out in the appended claims.

EXAMPLE I

Appended Table I tabulates various properties of phosphorus-modified alumina spherical particles prepared in accordance with the method of the present invention and compares the invention particles to the prior art alumina displayed in column 1 of Table I.

Each of the phosphorus-modified alumina spherical particles whose properties are tabulated in the table was prepared by a method substantially as set out below.

Metallic aluminum was digested in dilute hydrochloric acid at a temperature of about 102° C. to yield a hydrosol containing polymeric alumina hydroxychloride in about 0.88 Al:Cl weight ratio (12.5 wt. % Al). Thereafter, an amount of phosphoric acid calculated to provide the respective phosphorus contents of each calcined spherical particle other than the particle used as a control was added to the hydrosol. Appropriate amounts of $H_2O$ were added in each experiment to maintain alumina and aluminum phosphate solids contents between 25-30%. Each hydrosol containing phosphorus was then cooled and admixed with aqueous hexamethylenetetramine (HMT) solution to provide a hydrosol containing an HMT to Cl molar ratio of 0.4. The mixture was maintained at 5°-10° C.

The hydrosol was formed into spheroidal hydrogel particles by emitting the same as droplets into an oil suspending medium contained in a dropping tower at about 95° C. The spherical gel particles were aged in a portion of the gas oil for about 1.5 hours at 140° C. and 80 psig (551 kPa gauge) pressure. After the aging treatment, the spheres were washed with water at a temperature of about 95° C. The subsequent drying of the spheres was effected at a temperature of 120° C. for a period of 2 hours. Finally, the phosphorus-modified alumina spheres were calcined at a temperature of about 650° C. for about 2 hours in the presence of (3% $H_2O$) moist air.

TABLE I

| Phosphorus-Modified Alumina Spherical Particles Properties | | | | | | | |
|---|---|---|---|---|---|---|---|
| Sample | 1 | 2 | 3 | 4 | 5 | 6 | 7 |
| Wt. % P | 0 | 1.2 | 3.3 | 6.3 | 15.7 | 18.5 | 24.7 |
| Al:P molar ratio | ∞ | 45:1 | 15:1 | 7.3:1 | 2.3:1 | 1.6:1 | 1:1 |
| % γ $Al_2O_3$** | 85 | 75 | 60 | 41 | 4 | 0 | 0 |
| $Al_2O_3$ Crystallite Size Angstroms | 40 | 35 | 34 | 32 | 30 | *1 | *1 |
| SA $m^2/g$ | 225 | 275 | 349 | 336 | 322 | 242 | 141 |
| PV cc/g | 0.51 | 0.61 | 0.77 | 0.75 | 0.69 | 0.66 | 0.91 |
| PD A | 91 | 88 | 88 | 89 | 86 | 109 | 258 |
| ABD g/cc | 0.75 | 0.66 | 0.59 | 0.58 | 0.56 | 0.56 | 0.45 |
| Skeletal Density | 3.5 | 3.38 | | 2.93 | 2.67 | 2.48 | 2.29 |

*1 indicates that the spherical particles were totally amorphous.
**wt. % as detected by X-ray diffraction Table I shows the effects of varying the amounts of phosphorus addition in accordance with the method of the present invention upon calcined spherical particles. It is to be noted that the ABD of the calcined sphere decreases as the phosphorus content of the calcined spheres increases. The increased phosphorus content of the calcined spheres, of course, implies increased phosphorus-containing compound addition to the hydrosol. The decrease in ABD of the calcined spheres as related to the increase in phosphorus content of the spheres (or increased phosphorus-containing compound addition to the hydrosol) is surprising and unexpected. U.S. Pat. No. 4,008,182 teaches that an increased ratio of metals-/acid anion tends to yield particles possessing lower ABD values (see column 3, lines 49-53). In contradistinction, it has now been discovered that the addition of phosphorus-containing compounds, e.g., phosphoric acid which decreases the metals/acid anion ratio, results in a decrease of ABD.

Further, it is to be noted that, as the phosphorus content is increased, the skeletal density decreases. This implies the formation of aluminum phosphate as the skeletal density of aluminum phosphate is less than that of gamma-alumina.

The significant effects of phosphorus content upon the pore volume, surface area and average pore size are also to be noted. Such effects are in contradistinction to the observances in U.S. Pat. No. 3,969,273 wherein the addition of phosphate to the alumina hydrogel produced no change in the nitrogen pore volume of final phosphate-containing alumina product over the non-phosphate modified alumina. Further, the average pore diameter of the aluminum phosphate produced by the method of the present invention is substantially greater than the pore diameters achieved in U.S. Pat. No. 3,342,750; compare, for instance, the 258 Angstrom pore diameter in the 24.7% P containing support prepared by the method of the invention versus the pore diameter achieved in the Example I of U.S. Pat. No. 3,342,750 of 72 Angstroms. When a commercially available $AlPO_4$ was investigated, it was found to possess a surface area of only 1.66 $m^2/g$ and a crystalline structure.

Finally, as shown in Table I, the relationship between the degree of gamma-alumina crystallinity of the calcined phosphorus-modified spheres and the phosphorus content of the spheres should be noted. The test data shows that the invention provides for a method of decreasing the degree of crystallinity by increasing the phosphorus content of the calcined spheres, i.e., increasing the phosphorus-containing compound addition to the hydrosol.

EXAMPLE II

Infra-red transmission spectra of the phosporus-modified aluminas of the present invention were studied. The materials of the present invention give rise to certain characteristic absorption bands, namely, at about 3450 $cm^{-1}$, 1650 $cm^{-1}$, 1100 $cm^{-1}$, and 500 $cm^{-1}$ with a shoulder (or inflection) at about 700 $cm^{-1}$. The absorption band at 1100 $cm^{-1}$ indicates that the existence of a $PO_4^{-3}$ configuration in the calcined phosphorus-modified alumina as $AlPO_4$. From Example I it is known that the $AlPO_4$ specie in the materials of the present invention possess an amorphous morphology as determined by X-ray diffraction analysis.

FIG. 1 represents an infra-red spectrum of gamma-alumina (Sample 1 of Table I).

Figure 2:
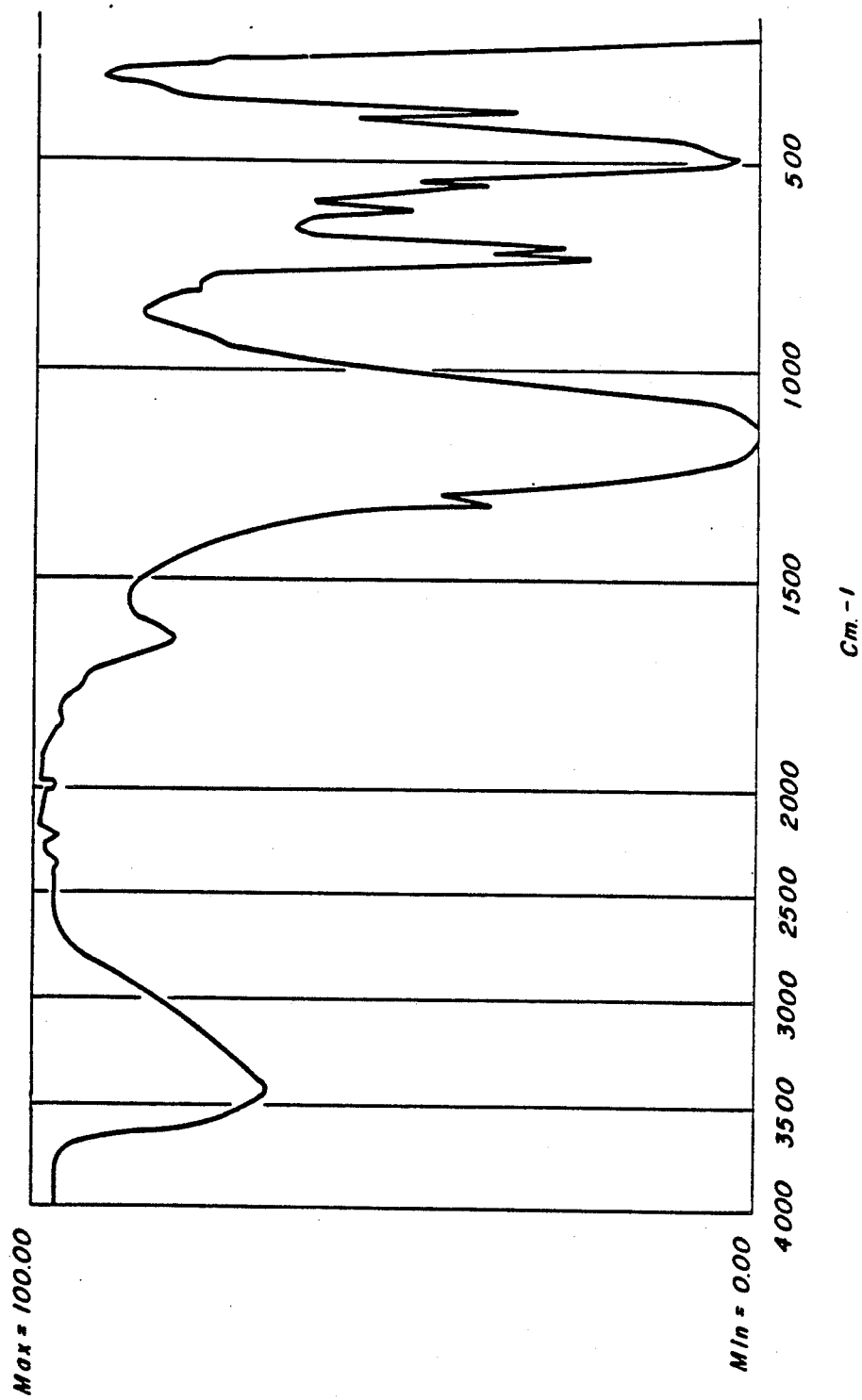

FIG. 2 represents an infra-red spectrum of commercially available aluminum phosphate not prepared by the method of the present invention.

Figure 3:
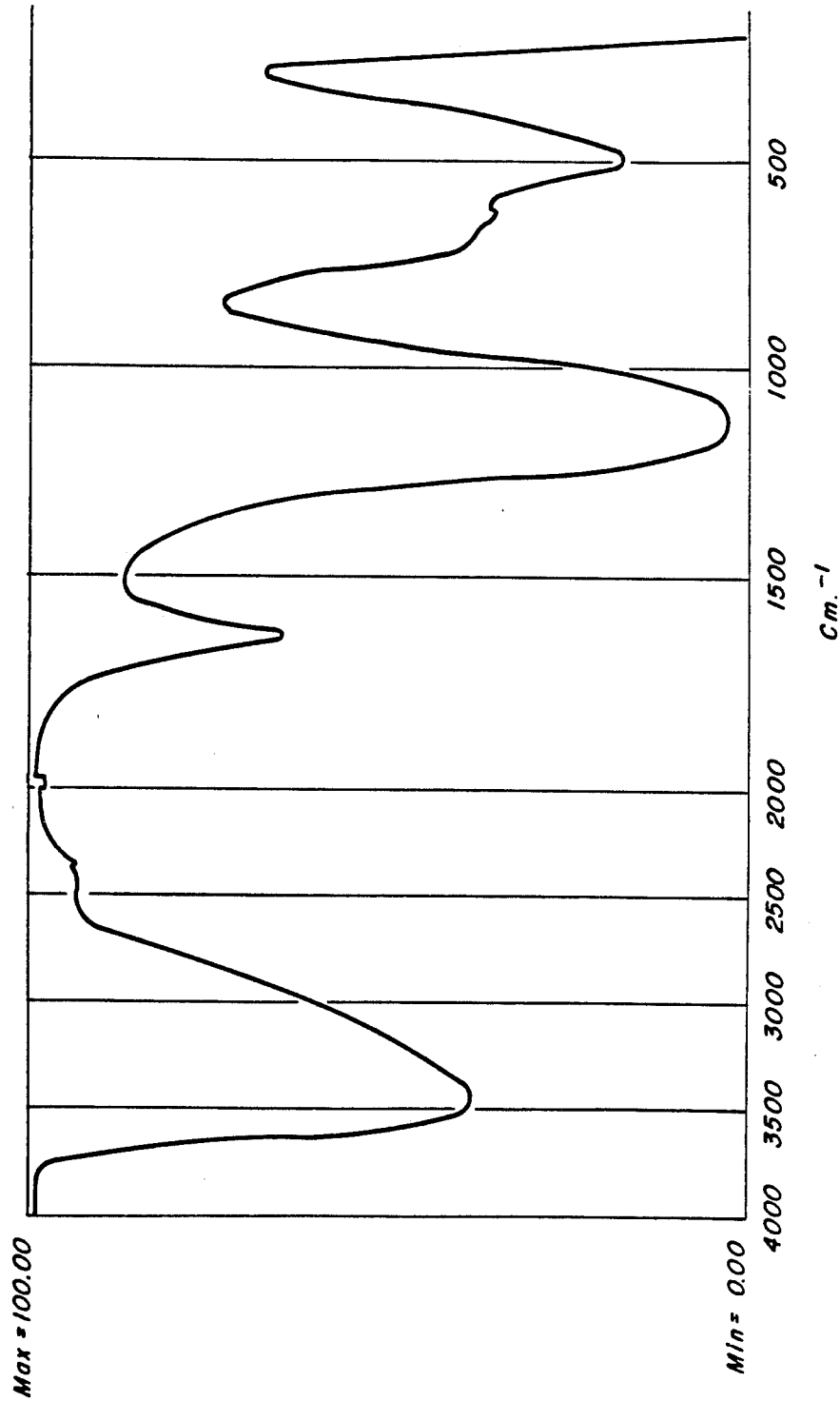

FIG. 3 represents an infra-red spectrum of phosphorus-modified alumina spheres prepared by the method of the invention containing 20.5 wt. % Al and 24.7 wt. % P which corresponds to the empirical formula for aluminum phosphate, i.e., a 1:1 Al:P molar ratio.

Figure 4:
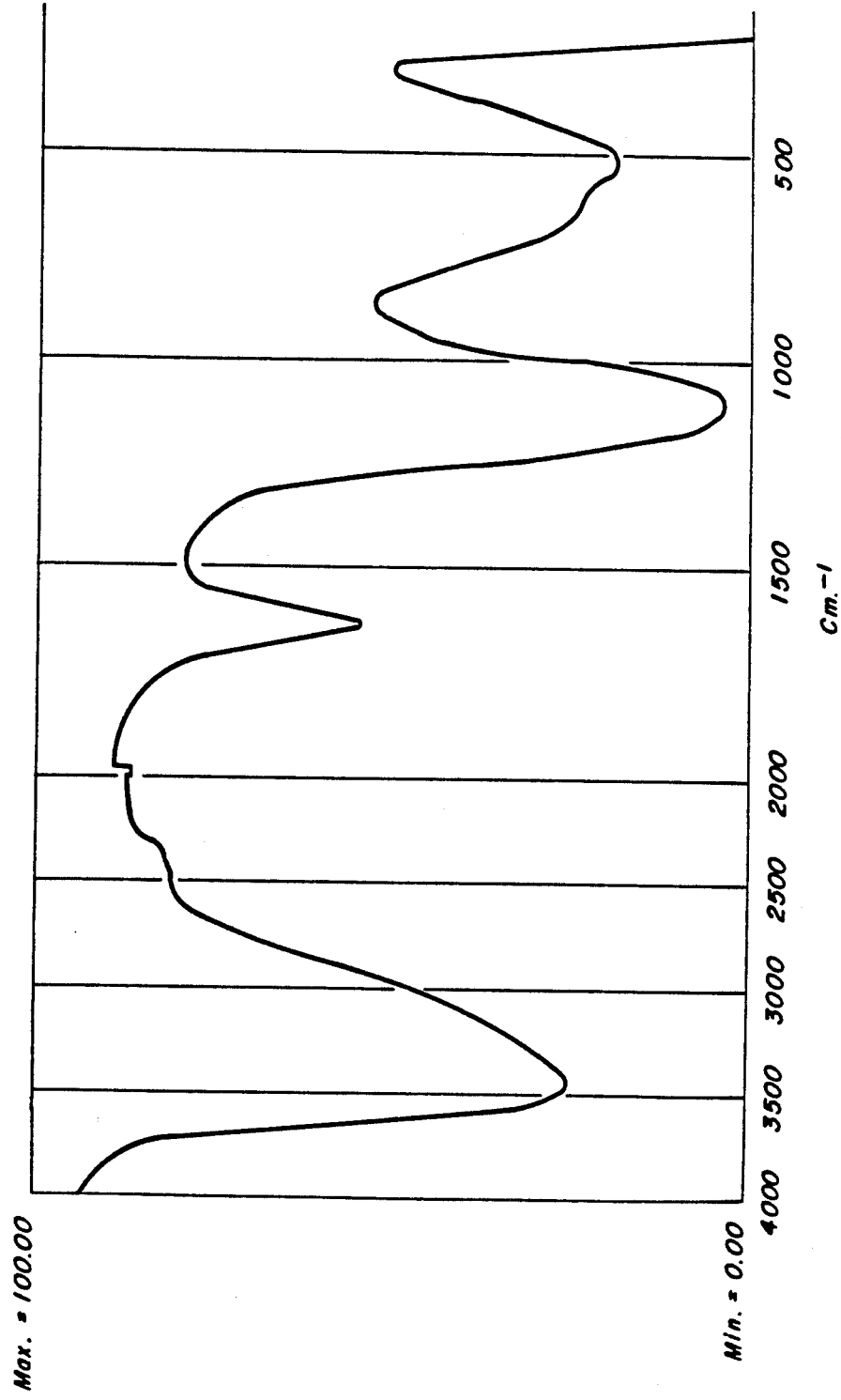

FIG. 4 represents an infra-red spectrum of phosphorus-modified alumina spheres containing 18.5 wt. % prepared by the method of the invention.

Figure 5:
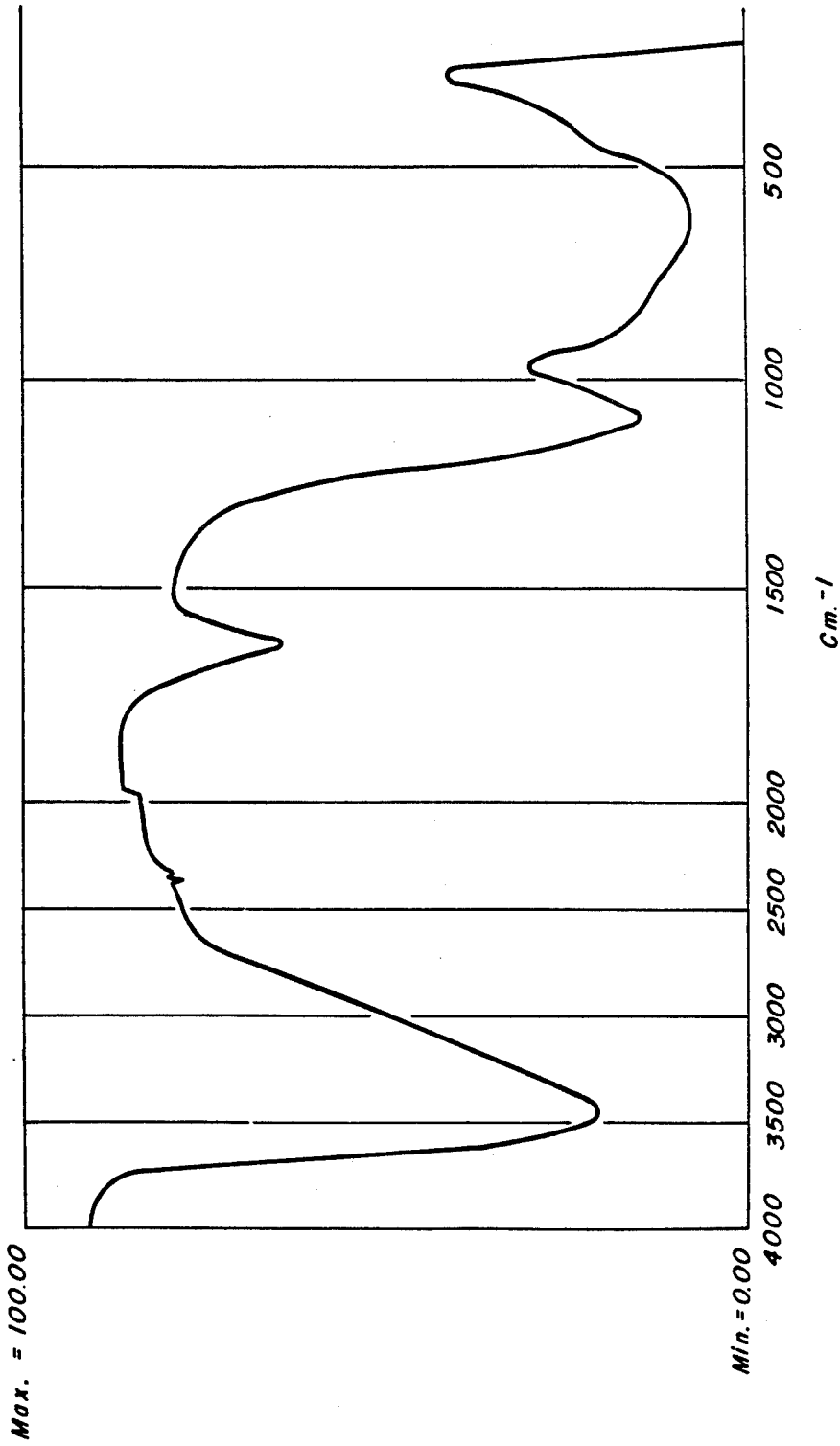

FIG. 5 represents an infra-red spectrum of phosphorus-modified alumina spheres containing 6.3 wt. % P prepared by the method of the invention.

Figure 6:
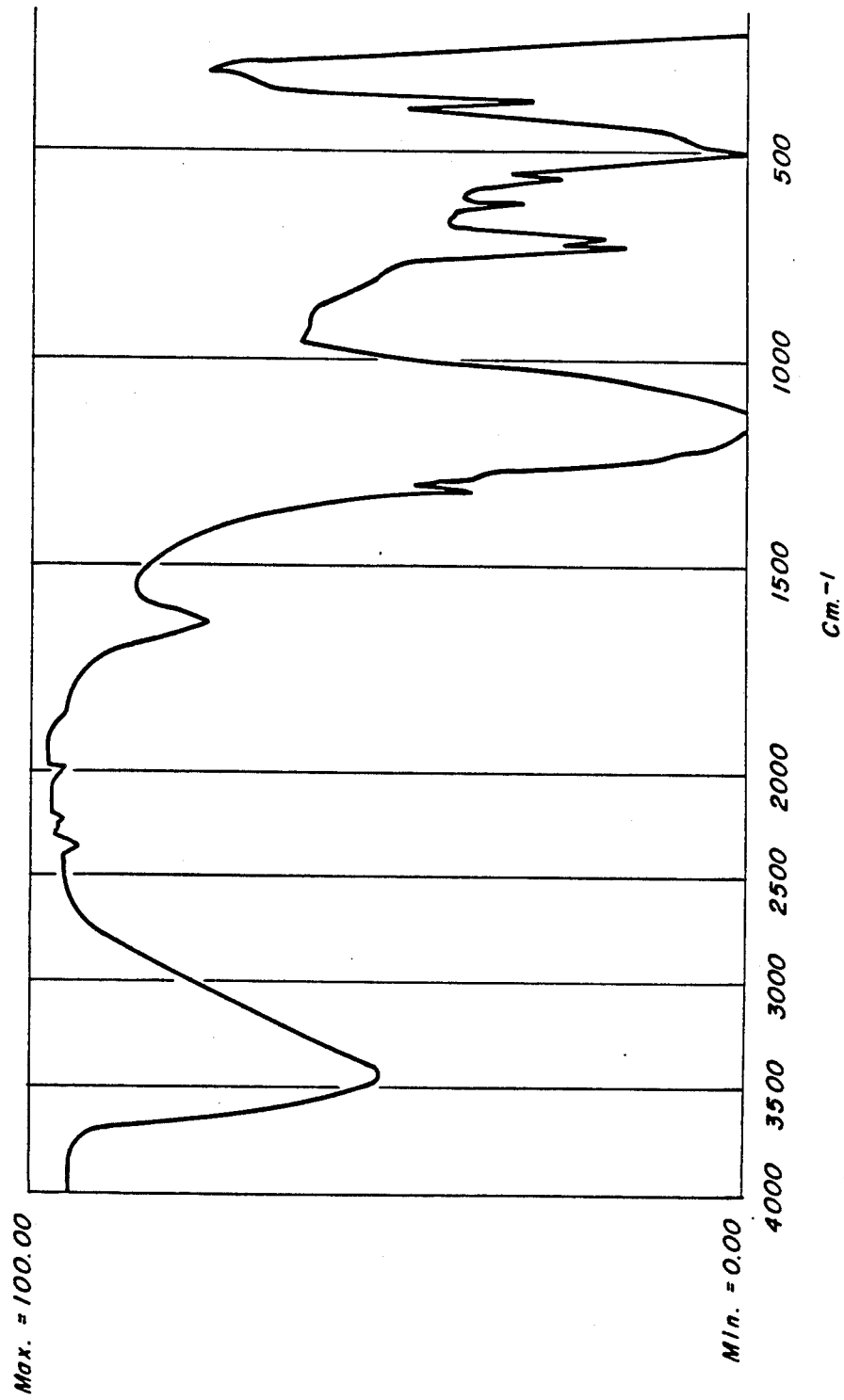

FIG. 6 represents an infra-red spectrum of a physical mixture of alumina and commercially available aluminum phosphate powder.

Interestingly, FIG. 3 shows the infra-red spectrum for a phosphorus-modified alumina sphere of the present invention possessing the same empirical formula as the commercial aluminum phosphate (see infra-red spectrum of FIG. 2), yet the spectra for the two compositions are different. Note that the infra-red spectrum depicted in FIG. 2 has an absorption band at about 750 $cm^{-1}$ which band is not present in the materials of the present invention. Also, the infra-red spectrum for a physical mixture of $AlPO_4$ depicted in FIG. 6 is distinct in that there is an absorption band at about 750 $cm^{-1}$. Finally, it should be noted that the infra-red spectrum for alumina (FIG. 1) possesses a broad band at 900 to 500 $cm^{-1}$ which is not characteristic of the absorption spectra of materials produced by the method of the present invention.

EXAMPLE III

The appended Table II sets forth the results of several microreactor activity tests carried out using materials prepared in accordance with the present invention (Tests 1 and 2), and a control gamma-alumina material (Test 3). The microactivity tests were performed with an atmospheric pulse reactor. In the experiment, approximately 250 mg of 40-60 mesh catalyst was pre-dried in flowing $H_2$ at 550° C. for 2 hours. The temperature was then lowered to 425° C. in $H_2$ and a stream of $H_2$ saturated with 1-heptene feed at 0° C. was diverted through the system. Products resulting from conversion of the 1-heptene were hydrogenated. The subsequent product stream was analyzed by gas chromatography. The product distributions in Table II have been tabulated with respect to the 1-heptene feed.

Note that the phosphorus-modified alumina of the present invention possesses an extremely low reactivity at these conditions towards 1-heptene. These results are in contrast to results obtained with the $AlPO_4$ catalyst disclosed in U.S. Pat. No. 3,342,750. Specifically, Example 10 of U.S. Pat. No. 3,342,750 shows that the $AlPO_4$ gel prepared in accordance with the reference's teachings possesses a high activity with respect to cracking a gas oil. It is believed that the findings of the present 1-heptene microreactor reactivity test are indicative of the hydrocarbon conversion activity of the present invention and that the materials would possess insignificant cracking ability with respect to a gas oil at similar conditions. Test 1, carried out utilizing the phosphorus-modified alumina composite prepared in accordance with the present invention, shows virtually no activity with respect to 1-heptene conversion. The relative inertness of the materials of the present invention may, in certain applications, be a desirable quality when these materials are employed as catalyst supports or carriers.

TABLE II

| MICROREACTOR REACTIVITY TEST | | | |
|---|---|---|---|
| | Test 1 alumina containing 24.7% P | Test 2 alumina containing 3.0% P | Test 3 γ alumina |
| TEMPERATURE (°C.) | 425 | 425 | 425 |
| INJECTION TIME (MINS.) | 21 | 16 | 15 |
| FLOW RATE (cc/MIN.) | 250 | 250 | 250 |
| % CONVERSION: | 7.0 | 26.4 | 55.5 |
| CRACKING | 1.5 | 1.7 | 1.7 |
| ISOMERIZATION | 3.7 | 20.9 | 44.2 |
| CYCLIZATION | 1.8 | 3.8 | 9.3 |

EXAMPLE IV

A sample of $AlPO_4$ powder was prepared in accordance with the precipitation method as disclosed in U.S. Pat. No. 2,441,297. In particular, 126 grams of aluminum nitrate ($Al(NO_3)_3 \cdot 9H_2O$) were dissolved in 700 ml $H_2O$ and 45 grams of ammonium phosphate dibasic (($NH_4)_2HPO_4$) were dissolved in another 200 ml $H_2O$. The above two solutions were mixed together while stirring and thereafter stirred for 1 hour. The solution mixture was allowed to stand undisturbed for 3 days. A white powder-like precipitate was filtered from the solution and washed with about 200 ml of $H_2O$. The powder was dried at 100° C. for ½ hour and subsequently calcined at 600° C. for ¾ hours. An X-ray diffraction analysis of this white powder yielded the sole presence of orthorhombic $AlPO_4$ possessing a high degree of crystallinity. This is in contrast to the amorphous phosphorus-modified alumina composite which corresponds to the empirical formula for aluminum phosphate, i.e., 1:1 Al:P molar ratio which is present in the particles of the present invention prepared by an oil-drop gelation procedure.

EXAMPLE V

A direct comparison of the phosphorus-modified alumina composite of the present invention was made to the phosphate containing alumina precipitate described by Kehl in U.S. Pat. No. 4,080,311. The phosphate containing alumina precipitate of the prior art was prepared by the technique described in Example 1 of the Kehl patent, U.S. Pat. No. 4,080,311, with one exception. After calcination in air at 500° C. for 16 hours, the product material was thereafter further calcined at 650° C. for 2 hours rather than at 900° C. for 16 hours as set forth in the example. The second calcination was conducted at 650° C. for 2 hours in order to closer approximate the calcination conditions for the phosphorus-modified alumina composite of the present invention. The difference in calcination temperatures is not considered crucial since Kehl teaches a thermally stable composite between calcination temperatures of 500° C. to 900° C.

TABLE III

| Composite | Kehl U.S. Pat. No. 4,080,311 | Sample 5 Example I |
|---|---|---|
| Wt. % P | 15.7 | 15.7 |
| Wt. % Al | 29.9 | 30.9 |
| Wt. % $Al_2O_3$ (by X-ray defraction) | Amorphous | 4 |
| SA $m^2/g$ | 137 | 322 |
| PV cc/g | 0.46 | 0.69 |
| PD (A) | 134 | 86 |

TABLE IV

MICROREACTOR REACTIVITY TEST

| Composite | Kehl | Sample 5 Example I |
|---|---|---|
| Temp. °C. | 549 | 549 |
| Conversion % | 10.4 | 24.2 |
| Selectivity % | | |
| Cracking | 45.2 | 34.2 |
| Cyclization | 10.0 | 7.8 |
| Isomerization | 44.8 | 58.0 |

Table III illustrates various properties of the Kehl composite and Sample 5 from Table I of the present specification. Table III shows that the surface area of the phosphorus-modified alumina composite of the present invention is more than twice that of the Kehl composite even though both contain almost identical amounts of phosphorus and aluminum (322 m$^2$/g vs. 137 m$^2$/g). It is noted that, even though the pore radius of the prepared composite of 67 Angstroms (i.e., 134 A/2=67 A) is less than the 75 to 150 Angstrom range taught by the Kehl patent, this minor difference is not the cause of the vast difference in surface area.

In addition, microactivity tests comparing the two composites of Table 3 were carried out. 1-heptene was used as the reactant. The tests were conducted under conditions identical to the microreactivity tests of Example III except that, after pre-drying, the temperature was lowered to 549° C. Table IV shows that the phosphorus-modified alumina composite of the present invention has an activity of 1-heptene conversion about 2.5 times that of the prepared Kehl composite. In addition, the selectivity toward cracking and isomerization of the two composites is different. The Kehl composite exhibited a much higher hydrocracking selectivity (45.2%) than the present composite (34.2%). Conversely, the phosphorus-modified alumina composite of the present invention exhibited higher isomerization selectivity (58.0%) than the Kehl composite (44.8%). Thus, even at cracking conditions more severe than those of Example III, the selectivity of the phosphorus-modified alumina composite of the present invention, with regards to cracking, is lower than exhibited by the prior art.

EXAMPLE VI

The following example illustrates a hydrotreating process employing the phosphorus-modified alumina composite of the present invention. Sample 3 from Table I of the present specification was impregnated with molybdenum and nickel in the following manner. A 44.70 g (0.263 moles Mo) sample ammonium dimolybdate (ADM) was dissolved in 120 g of 10.9 weight % ammonia solution (prepared by adding 50 ml of concentrated ammonium hydroxide to 75 ml of deionized water). After the addition of 24.7 ml (0.103 moles Ni) of nickel nitrate solution (15.4% Ni, d=1.59 g/ml), the resultant reaction mixture (pH=8.4) was poured onto 141.7 g of the phosphorus-modified alumina composite of the present invention, which was rotating in a 2630 ml glass evaporator. The admixture was cold-rolled for 30 minutes, dried at 100° C. and calcined in a tube furnace at 950° F. for 2 hours (warm-up time approximately 30 minutes) in the presence of air (1.5 SCFH 0.042 std m$^3$/h). The finished catalyst specifications are as follows:

| | | | |
|---|---|---|---|
| Mo wt. %, (vf) | 12.8 | Surface Area, m$^2$/g | 196 |
| Ni wt. %, (vf) | 3.22 | Pore Volume, ml/gr | 0.45 |
| P wt. %, (vf) | 2.9 | Pore Diameter, A | 92 |

100 cc of the nickel-molybdenum containing catalyst prepared as above was loaded as a single fixed bed. A feedstock blend of coker gas oil and vacuum gas oil, the properties of which are indicated in Table V, was preheated to 120° C. and contacted with the catalyst bed a downflow LHSV feed rate of 1.5 hr.$^{-1}$. The reactor was maintained at a temperature of 725° F. (385° C.), a pressure of 800 psig (5,516 kPa gauge) with makeup hydrogen and a total gas recycle of 2,000 standard cubic feet per barrel (3,554 std m$^3$/m$^3$).

TABLE V

FEEDSTOCK SPECIFICATIONS

| | |
|---|---|
| Density (kg/m$^3$) | 926.94 |
| °API (60° F.) | 21.0 |
| Specific Gravity | 0.9279 |
| Molecular Weight | 341 |
| Wt. % N | 0.185 |
| Wt. % Basic N | 0.066 |
| Wt. % S | 2.78 |
| Wt. % C | 85.98 |
| Wt. % H | 11.78 |
| H/C | 1.6 |

The reactor effluent was fed to a stripper wherein the gas and liquid products were separated. The liquid product was collected and purged with nitrogen gas. The gas product was scrubbed with a 15% KOH solution prior to recycle to the reactor.

TABLE VI

LIQUID PRODUCT

| | |
|---|---|
| Wt. % N (Basic N) | 0.013 |
| % HDN (Basic N) | 80.3 |
| Wt. % N | 0.079 |
| Wt. % HDN | 57.3 |
| Wt. % S | 0.18 |
| % HDS | 93.5 |

Table VI lists the nitrogen and sulfur content of the liquid product. By comparing Table VI with Table V, it can be seen that the feedstock experienced 57.3% denitrification (80.3% denitrification as measured by Basic N) and 93.5% desulfurization.

It is contemplated that the subject catalyst can be utilized to perform a number of processes other than hydrotreating. These processes include isomerization of $C_4$-$C_{12}$ paraffins, isomerization of alkylaromatic hydrocarbons, alkylation of aromatic hydrocarbons, dehydrocyclodimerization of $C_3$ and/or $C_4$ aliphatic hydrocarbons and the alkylation of paraffinic hydrocarbons. The subject invention therefore includes such hydrocarbon conversion processes as the alkylation of benzene with ethylene to produce ethylbenzene, the alkylation of benzene or toluene with propylene, the alkylation of benzene with a $C_{10}$-$C_{15}$ linear monoolefin to produce linear alkylbenzenes, the alkylation of isobutane with a butene to produce motor fuel components, and the transalkylation of toluene and trimethylbenzenes to produce xylenes. These petrochemical processes normally employ a catalyst containing a platinum group metal.

The catalyst compositions contemplated for usage in these processes therefore normally include a support comprising the phosphorus-modified alumina characterized herein plus at least one platinum group metal or metals such as platinum, platinum and rhodium, palladium, palladium and rhodium or a platinum group metal plus another metal such as either platinum or palladium plus tin. In the case of dehydrocyclodimerization, the preferred metal is gallium. The preferred supports for these processes are high-purity phosphorus-modified alumina, a combination of the phosphorus-modified alumina with from 2 to 35 wt. percent of a zeolite which is preferably mordenite or a ZSM-5 type zeolite, or a combination of phosphorus-modified alumina with from 5 to 85 wt. % of an unmodified alumina. These processes are performed at the appropriate conversion conditions. For instance, the isomerization of paraffins may be performed at a temperature of about 150 to about 325 degrees C., a L.H.S.V. of 0.1 to 12.0, a pressure of from 10 to 600 psig and a hydrogen to hydrocarbon mole ratio between 1.0 and 5.0. Alkylation processes may be performed with vapor phase, liquid phase or mixed phase conditions as are well known in the art. Dehydrocyclodimerization conditions and processing are described in U.S. Pat. No. 4,548,619, which is incorporated herein by reference.

One specific alkylation process of the subject invention is the alkylation of an aromatic hydrocarbon with a $C_2$–$C_{20}$ acyclic olefin. Specific examples are the alkylation of benzene or toluene with ethylene or propylene. In this instance it is not necessary to provide metals on the catalyst, although they may be deposited upon the surface modified alumina if desired. Alkylation promoting conditions for this process include a temperature of from about 240 to 410 degrees C., a pressure of from 5 to 450 psig (34.5 to 3100 kPa g), a liquid hourly space velocity of 0.5 to 24 and a relative ratio of aromatic::olefin:hydrogen of 1:1:1 to 12:1:35. Aromatic to olefinic hydrocarbon ratios above 2:1 are preferred.

What is claimed is:

1. An alkylation process which comprises contacting a hydrocarbon feedstock with a catalyst, maintained at alkylation-promoting conditions, comprising an amorphous phosphorus-modified calcined alumina hydrogel composite having a molar ratio on an elemental basis of aluminum to phosphorous less than 2.3:1 and having a surface area of from about 140 to 450 $m^2/g$.

2. The process of claim 1 wherein said process is the alkylation of an aromatic hydrocarbon with a $C_2$–$C_{20}$ acyclic olefin.

3. The process of claim 2 wherein the olefin is ethylene and the aromatic hydrocarbon is toluene.

4. The process of claim 2 wherein the aromatic hydrocarbon is benzene.

5. The process of claim 1 wherein the hydrogel is formed by the gelation of a homogeneous hydrosol having an aluminum to chloride compound weight ratio of from about 0.7:1 to 1.5:1.

6. The process of claim 5 wherein the hydrogel has a micropore volume from about 0.35 to 0.95 cc/g.

7. The process of claim 6 wherein the average micropore diameter of the hydrogel is from about 40 to 300 A.

8. The process of claim 7 wherein the hydrogel possesses absorption bands in the infra-red spectrum at about 3450 $cm^{-1}$, 1100 $cm^{-1}$ with an inflection at about 700 $cm^{-1}$ utilizing the kBr Pellet method.

9. The process of claim 1 wherein the catalyst is substantially free of gamma alumina.

10. The process of claim 9 wherein the hydrogel has a molar aluminum to phosphorous ratio below 1.6:1.

11. The process of claim 10 wherein the catalyst comprises particles of a crystalline zeolite aluminosilicate which is incorporated into the hydrosol prior to the forming of the hydrosol into spherical form, with the aluminosilicate being chosen from the group consisting of Y zeolites, ZSM-5 zeolites, mordenite and L zeolites.

* * * * *